(12) United States Patent
Schlichting et al.

(10) Patent No.: US 8,784,944 B2
(45) Date of Patent: Jul. 22, 2014

(54) PLASMA-SPRAY POWDER MANUFACTURE TECHNIQUE

(75) Inventors: Kevin W. Schlichting, Storrs, CT (US); Paul H. Zajchowski, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 1324 days.

(21) Appl. No.: 11/605,647

(22) Filed: Nov. 29, 2006

(65) Prior Publication Data

US 2010/0028698 A1 Feb. 4, 2010

(51) Int. Cl.
| | |
|---|---|
| *C23C 4/10* | (2006.01) |
| *C04B 35/488* | (2006.01) |
| *C23C 4/12* | (2006.01) |
| *C23C 4/08* | (2006.01) |
| *C04B 35/46* | (2006.01) |
| *C04B 35/49* | (2006.01) |
| *C04B 35/626* | (2006.01) |
| *C04B 35/653* | (2006.01) |
| *C23C 28/00* | (2006.01) |

(52) U.S. Cl.
CPC ............... *C04B 35/488* (2013.01); *C23C 4/127* (2013.01); *C23C 4/085* (2013.01); *C04B 35/46* (2013.01); *C04B 35/49* (2013.01); *C04B 2235/3232* (2013.01); *C04B 2235/3244* (2013.01); *C04B 35/62665* (2013.01); *C04B 35/653* (2013.01); *C04B 2235/3224* (2013.01); *C04B 2235/3234* (2013.01); *C04B 2235/3246* (2013.01); *C04B 2235/3248* (2013.01); *C04B 2235/3255* (2013.01); *C23C 4/08* (2013.01); *C23C 4/105* (2013.01); *C23C 4/12* (2013.01); *C23C 28/321* (2013.01); *C23C 28/3215* (2013.01); *C23C 28/3455* (2013.01)

USPC ........... 427/454; 427/453; 427/456; 427/404; 427/419.2

(58) Field of Classification Search
CPC ........................................................ C23C 4/105
USPC ........................................................ 427/454
See application file for complete search history.

(56) References Cited

U.S. PATENT DOCUMENTS

| | | | | |
|---|---|---|---|---|
| 2,653,107 | A | * | 9/1953 | Blumenthal ................... 501/103 |
| 4,207,159 | A | * | 6/1980 | Kimura et al. ................ 204/425 |
| 4,565,792 | A | * | 1/1986 | Knapp .......................... 501/104 |
| 4,588,655 | A | * | 5/1986 | Kushner ....................... 428/633 |
| 4,645,716 | A | * | 2/1987 | Harrington et al. ........... 428/472 |
| 4,646,950 | A | * | 3/1987 | Gotoh et al. .................. 222/591 |
| 4,753,902 | A | * | 6/1988 | Ketcham ........................ 501/87 |
| 4,923,830 | A | * | 5/1990 | Everhart et al. ............... 501/103 |
| 5,061,665 | A | | 10/1991 | Seki et al. |

(Continued)

FOREIGN PATENT DOCUMENTS

EP 1375701 A1 1/2004

OTHER PUBLICATIONS

Answers.com, www.answers.com/topic/alloy, defintion of "alloy", Oct. 2009, p. 1.*

(Continued)

*Primary Examiner* — Katherine A Bareford
(74) *Attorney, Agent, or Firm* — Kinney & Lange, P.A.

(57) ABSTRACT

A ceramic thermal barrier coating having improved erosion resistance includes a metallic layer and a ceramic layer positioned on the metallic layer. The ceramic layer includes a first powder, a second powder, and a third powder. The first powder and the second powder are alloyed together prior to being mixed with the third powder.

9 Claims, 2 Drawing Sheets

(56) References Cited

U.S. PATENT DOCUMENTS

| | | | |
|---|---|---|---|
| 5,338,577 A * | 8/1994 | Burdette, II | 427/453 |
| 5,728,636 A * | 3/1998 | Nawa et al. | 501/105 |
| 6,596,397 B2 * | 7/2003 | Kaneyoshi et al. | 428/402 |
| 6,955,308 B2 * | 10/2005 | Segrest et al. | 241/1 |
| 2003/0215665 A1 | 11/2003 | Bruce et al. | |
| 2004/0115406 A1 * | 6/2004 | Nagaraj et al. | 428/209 |
| 2006/0024528 A1 * | 2/2006 | Strangman et al. | 428/701 |

OTHER PUBLICATIONS

The Extended European Search Report for counterpart European Application No. 07254576 filed Nov. 26, 2007.

* cited by examiner

PLASMA-SPRAY POWDER MANUFACTURE TECHNIQUE

BACKGROUND OF THE INVENTION

Due to the high operating temperature environment in gas turbine engines, ceramic thermal barrier coatings (TBCs) are commonly applied to combustors and high turbine stationary and rotating parts to extend the life of the parts. TBCs typically consist of a metallic bond coat and a ceramic top coat applied to a nickel or cobalt based alloy. The TBCs are typically applied at thicknesses of between approximately 0.005 inches (0.127 millimeters) and approximately 0.04 inches (1.01 millimeters) and can provide up to an approximately 300 degree Fahrenheit (150 degree Celsius (° C.)) temperature reduction to the base metal. Thus, the TBC provides the part with increased durability, allows for higher operating temperatures, and results in improved turbine efficiency.

TBCs can be applied onto components by several different methods. For example, TBCs can be applied by electron beam physical vapor deposition (EB-PVD) or air plasma-spraying (APS). TBCs that are applied by APS tend to have low resistance to erosive particles due to coating porosity or changes in the crystalline structure due to chemistry modifications. Thus, it would be beneficial if a tougher material could be added to the TBCs to provide increased erosion resistance. Development of an erosion resistant TBC that could be applied by APS could result in significant cost savings, increased engine performance, and act as a product enabler. APS could be used to apply such TBCs to various gas turbine engine components, including, but not limited to: compressor components, cases, combustors, and turbine components.

BRIEF SUMMARY OF THE INVENTION

A ceramic thermal barrier coating having improved erosion resistance includes a metallic layer and a ceramic layer positioned on the metallic layer. The ceramic layer includes a first powder, a second powder, and a third powder. The first powder and the second powder are alloyed together prior to being mixed with the third powder.

DETAILED DESCRIPTION

Figure 1:
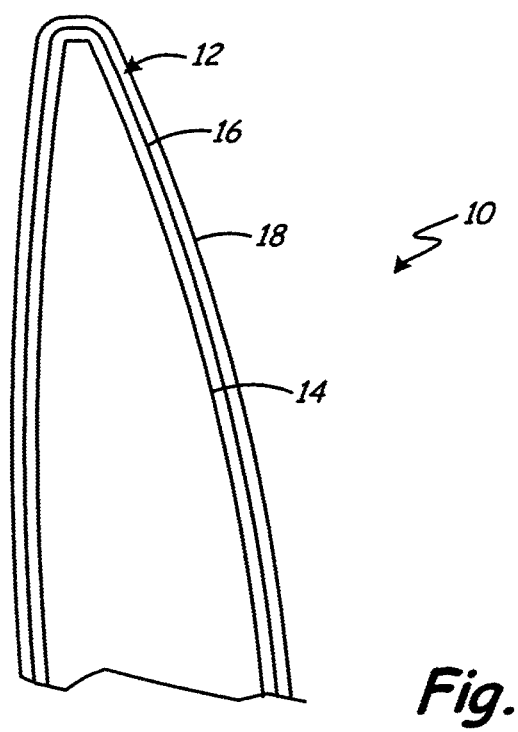
FIG. 1 is a cross-sectional view of a part having an erosion resistant coating.

FIG. 1 shows a cross-sectional view of part 10 having erosion resistant thermal barrier coating (TBC) 12 applied onto surface 14 of part 10. TBC 12 on part 10 contains a distinct phase that is alloyed to eliminate phase transformations within TBC 12 and increases the spallation life of TBC 12, and thus part 10. In addition, TBC 12 also has a lower thermal conductivity than current industry standard TBCs, such as yttria-stabilized zirconia. This facilitates the use of reduced cooling air for turbine components which can result in improved turbine efficiency and part durability. For example, because TBC 12 is a good insulator against heat, TBC 12 allows gas turbine engine part 10 to run at higher temperatures, improving turbine efficiency and reducing cost.

TBC 12 may also be a product enabler, enabling the use of particular designs, cooling schemes, or materials that would otherwise not be able to be used. For example, TBC 12 may allow the use of materials that are more economical but may not have all the required physical properties for a particular application. Therefore, an alloy with reduced physical properties, such as low oxidation resistance, low melting point, or low creep strength, may be used due to the increased thermal protection provided by TBC 12.

Substrate surface 14 provides a base for TBC 12, which is formed by metallic layer 16 and ceramic layer 18 positioned on metallic layer 16. Metallic layer 16 is typically known as a bond coat and may be deposited onto substrate surface 14 to bond substrate 14 to ceramic layer 18. Metallic layer 16 may be a MCrAlY bond coat, where M is at least one of nickel, colbalt, and iron. Alternatively, metallic layer 16 may be an aluminide or platinum aluminide bond coat. In an exemplary embodiment, metallic layer 16 has a thickness of between approximately 0.0005 inches (0.0127 millimeters) to approximately 0.02 inches (0.508 millimeters), and preferably from between approximately 0.0005 inches (0.0127 millimeters) to approximately 0.01 inches (0.254 millimeters). Metallic layer 16 may be deposited by a low pressure plasma spray, high velocity oxygen fuel (HVOF) spray, a cathodic arc process, a diffusion process, an air plasma spray process, or a plating process, or combinations thereof, or any other method that is capable of forming a dense, uniform metallic structure.

Ceramic layer 18 is formed from a first powder, a second powder, and a third powder. Prior to mixing with the third powder, the first powder and the second powder are alloyed together to form a homogeneous mixture. Examples of suitable compositions for the homogeneous mixture include, but are not limited to: titanium oxide and zirconium oxide, tantalum oxide and zirconium oxide, and titanium oxide and tantalum oxide. In an exemplary embodiment, the homogeneous mixture comprises between approximately 40 mol % and approximately 95 mol % titanium oxide and the balance zirconium oxide; between approximately 15 mol % and approximately 80 mol % tantalum oxide and the balance zirconium oxide; or between approximately 50 mol % and approximately 95 mol % titanium oxide and the balance tantalum oxide.

The third powder can be selected from the group consisting of: a zirconate, a hafnate, a titanate, and mixtures thereof, which have been doped with between approximately 5 weight percent and approximately 100 weight percent of at least one oxide. Examples of suitable oxides for the third powder of ceramic layer 18 include, but are not limited to oxides of: scandium, indium, yttrium, lanthanum, cerium, praseodymium, neodymium, promethium, samarium, europium, gadolinium, terbium, dysprosium, holmium, erbium, thulium, ytterbium, and lutetium. An example of a particularly suitable composition for the third powder is a rare earth stabilized zirconium oxide, such as gadolinia-stabilized zirconium oxide. In an exemplary embodiment, ceramic layer 18 is comprised of between approximately 2 wt % and approximately 50 wt % homogeneous mixture and the balance the third powder.

The first powder and the second powder are alloyed together to form a homogeneous mixture prior to being mixed with the third powder. The first and second powders are alloyed together in order to eliminate possible phase transformations that may be detrimental to the final TBC's cyclic durability. For example, a concern with titanium oxide is that it goes through phase transformations when exposed to cyclic temperatures that result in a change in volume that imparts stress into TBC 12. However, when titanium oxide is alloyed with the zirconium oxide, zirconium oxide eliminates the phase transformations of the titanium oxide. At the same time, the titanium oxide provides increased erosion resistance and fracture toughness.

The first powder and the second powder are alloyed by multiple fusing steps at temperatures above the melting point of the first and second powders to form the homogeneous mixture. In an exemplary embodiment, the first and second powders are first melted or fused together in an electric arc furnace at a temperature of approximately 4000 degrees Fahrenheit (° F.) (2204° C.). After the first and second powders have been fused together to form the homogeneous mixture, the homogeneous mixture is allowed to cool. Prior to placing the homogeneous mixture back into the furnace for a second fusing operation, the homogeneous mixture may optionally be broken up by any means known in the art, including, but not limited to: crushing and milling. The first and second powders are then fused together again at a temperature of approximately 4000° F. (2204° C.) to once again form the homogeneous mixture. The first and second powders are processed in the electric arc furnace at least two times. The batch or furnace where the first and second powders are being fused is held at this temperature for an amount of time sufficient to achieve a homogeneous melt and will depend on the melt composition. The electric arc fusing process may be completed in air but may also be completed in a protective atmosphere.

After the first and second powders have been properly processed to form the homogeneous mixture, the homogeneous mixture is again broken up into powder form to create a homogeneous powder mixture. The third powder is then mechanically mixed with the homogeneous powder mixture to create a ceramic powder mixture which is then applied as ceramic layer 18 onto metallic layer 16. Ceramic layer 18 may be applied onto metallic layer 16 by any suitable means known in the art. In an exemplary embodiment, ceramic layer 18 is plasma-sprayed onto metallic layer 16. Thus, the homogeneous powder mixture and the third powder are introduced into the plasma plume as a ceramic powder mixture which is melted within the plume and deposited as ceramic layer 18 onto metallic layer 16. Ceramic layer 18 provides lower thermal conductivity to TBC 12 while improving its resistance to erosion. In an exemplary embodiment, TBC 12 has a thermal conductivity from approximately 0.36 W/mK to approximately 0.94 W/mK.

Figure 2:
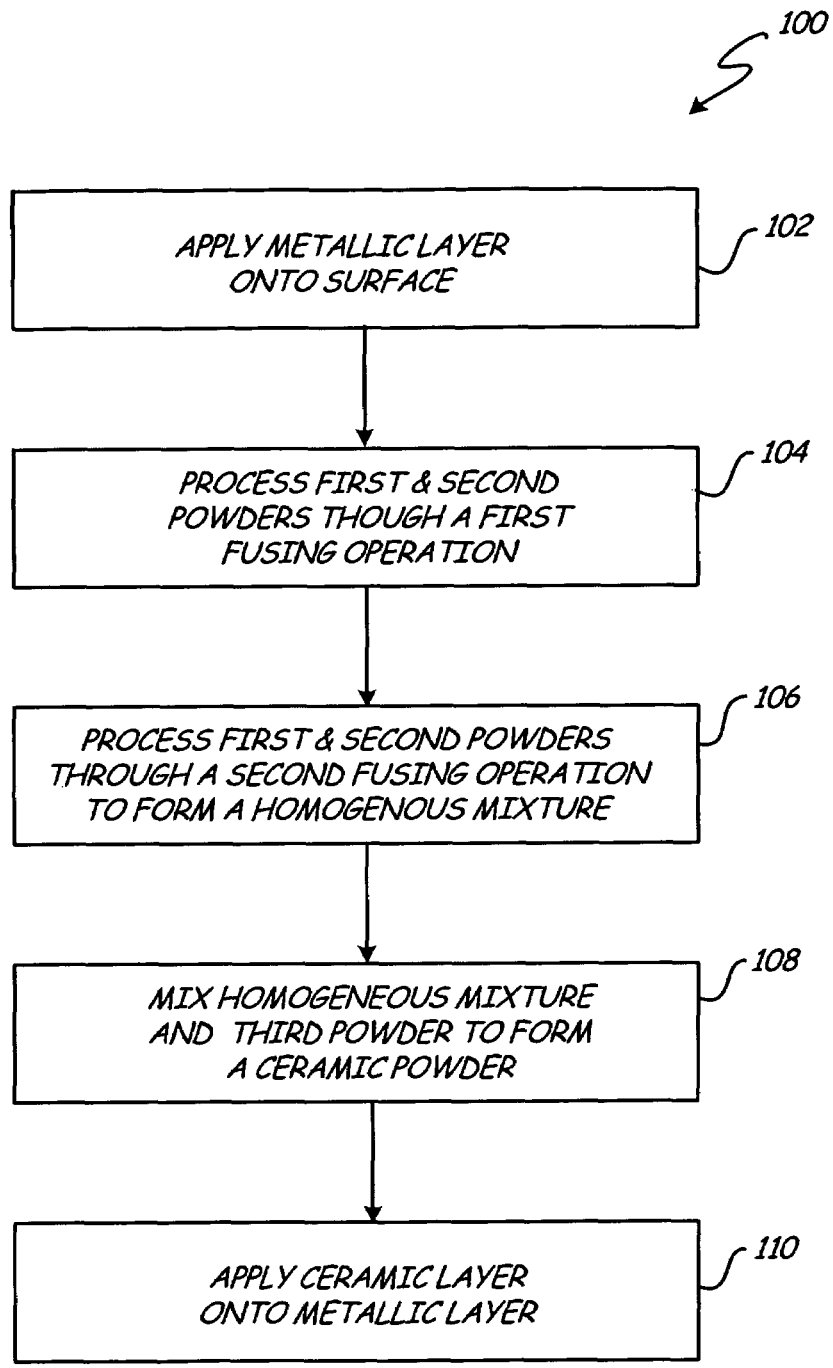
FIG. 2 is a block diagram of a method of applying the erosion resistant coating onto the part.

FIG. 2 shows a block diagram of an exemplary, non-limiting method 100 of applying an erosion resistant TBC 12 onto part 10. As shown in Box 102, metallic layer 16 is first applied onto surface 14. The first powder and the second powder are initially processed through a first fusing operation at a temperature above the melting point of the first and second powders to form a homogeneous mixture, Box 104. In one embodiment, first fusing operation occurs at approximately 4000° F. (2204° C.). After the homogeneous mixture is allowed to cool, the first powder and the second powder are sent through a second fusing operation at a temperature above the melting point of the first and second powders, Box 106. In one embodiment, the second fusing operation occurs at approximately 4000° F. (2204° C.). Prior to sending the first and second powders through the second fusing operation, the homogeneous mixture may optionally be crushed or milled such that the homogeneous mixture is in powder form. After the first powder and the second powder have been adequately fused and crushed to form a homogeneous powder mixture, a third powder is mixed with the homogeneous powder mixture to create a ceramic powder mixture of all three powders, Box 108. The ceramic powder mixture is then applied as ceramic layer 18 onto metallic layer 16, Box 110. In an exemplary embodiment, ceramic layer 18 is plasma-sprayed onto metallic layer 16.

The TBC includes a metallic layer and a ceramic layer applied onto a surface of a part. The ceramic layer is formed by a first powder, a second powder, and a third powder to form an erosion resistant coating. Through several fusing operations, the first powder and the second powder are fused together before being mixed with the third powder to form a ceramic powder mixture, which is then applied, via plasma spraying, as the ceramic layer on the metallic layer. The first and second powders interact with each other and, once mixed with the third powder, form a TBC having increased erosion resistance, increased fracture toughness, and greater phase stability. The TBC also has low thermal conductivity and may be used on various gas turbine engine components to reduce cost and improve performance.

Although the present invention has been described with reference to preferred embodiments, workers skilled in the art will recognize that changes may be made in form and detail without departing from the spirit and scope of the invention.

The invention claimed is:

1. A method of applying an erosion resistant coating onto a component, the method comprising:
    applying a bond coat to the surface of a component;
    melting titanium oxide ceramic powder and zirconium oxide ceramic powder at a temperature higher than the melting points of both ceramic powders to form a first homogeneous ceramic alloy melt consisting of between about 40 mol % and about 95 mol % titanium oxide and the balance zirconium oxide;
    cooling the first homogeneous alloy melt to form a first homogeneous solid ceramic alloy;
    creating a first homogeneous ceramic alloy powder from the first solid homogeneous ceramic alloy;
    mixing the first homogeneous ceramic alloy powder with a second ceramic powder to form a final ceramic powder mixture; and
    plasma spraying the final ceramic powder mixture onto the bond coat.

2. The method of claim 1 wherein the second ceramic powder is selected from a group consisting of a zirconate, a hafnate, a titanate, and mixtures thereof which have been doped with between about 5 weight percent and about 100 weight percent of at least one oxide.

3. The method of claim 2, wherein the at least one oxide comprises an oxide of scandium, indium, yttrium, lanthanum, cerium, praseodymium, neodymium, promethium, samarium, europium, gadolinium, terbium, dysprosium, holmium, erbium, thulium, ytterbium, and lutetium.

4. The method of claim 1, wherein the second ceramic powder comprises gadolinia stabilized zirconium oxide powder.

5. The method of claim 1, wherein the bond coat comprises a MCrAlY bond coat wherein M is at least one of nickel, cobalt, and iron.

6. The method of claim 1, wherein the bond coat comprises an aluminide or platinum aluminide bond coat.

7. The method of claim 1, wherein the titanium oxide and zirconium oxide ceramic powders are processed through at least two melting and powder creation operations to form the first homogeneous ceramic alloy powder prior to being mixed with the second ceramic powder to form the final ceramic powder mixture.

8. The method of claim 1, wherein the final ceramic powder mixture comprises between about 2 weight % and about 50 weight % first homogenous ceramic alloy powder and the balance the second ceramic powder.

9. The method of claim 1, wherein the bond coat is applied by low pressure plasma spray, high velocity oxygen fuel (HVOF) spray, cathodic arc deposition, diffusion, air plasma spray or plating.

* * * * *